United States Patent [19]

Matsushita

[11] Patent Number: 5,060,982
[45] Date of Patent: Oct. 29, 1991

[54] COUPLING SOCKET WITH CAM LEVER AND RECIPROCATING SLEEVE

[75] Inventor: Kaoru Matsushita, Tokyo, Japan

[73] Assignee: Nitto Kohki Co., Ltd., Tokyo, Japan

[21] Appl. No.: 624,699

[22] Filed: Dec. 6, 1990

[30] Foreign Application Priority Data

Dec. 19, 1989 [JP] Japan .............................. 1-145522[U]

[51] Int. Cl.$^5$ ............................................ F16L 37/22
[52] U.S. Cl. .................................... 285/190; 285/101; 285/312; 251/149.9
[58] Field of Search ............... 285/190, 312, 311, 310, 285/309, 87, 88, 8, 101, 102; 251/322, 323, 252, 149.9; 137/322

[56] References Cited

U.S. PATENT DOCUMENTS

| 1,784,822 | 2/1928 | Crowley | 285/312 X |
| 3,300,235 | 5/1964 | Blackwell, Jr. | 285/312 |
| 3,422,864 | 12/1966 | Allinquant | 285/101 X |
| 4,765,657 | 8/1988 | Cruse | 251/149.9 |

Primary Examiner—Randolph A. Reese
Assistant Examiner—Tim Aberle
Attorney, Agent, or Firm—Nixon & Vanderhye

[57] ABSTRACT

A socket for use with a plug, having a cylindrical connector, to form a pipe coupling comprises a main cylinder provided with a cylindrical side wall for defining an axial hole, an axial extending slit formed at the side wall of the main cylinder, and a lock system for selectively locking the connecting portion of the plug. The socket further comprises an inner sleeve including a rear portion axially guided through the inner hole of the main cylinder, an inner flow passage, end an engaging member having a front and projected outward from the rear sleeve in the radial direction and then outside through the slit. The inner sleeve can move between its advanced position where the inner flow passages are communicated with a flow passage in the connecting portion of the plug and its retreated position where they are separated from each other. An operating lever is pivoted on the side wall of the main cylinder at one end thereof to selectively move between first and second positions, and curved slits formed at the operating lever guides the engaging member in such a way that the sleeve is positioned at its advanced position when the operating lever is at the first position and that the sleeve is positioned at its retreated position when the operating lever is at the second position.

8 Claims, 3 Drawing Sheets

COUPLING SOCKET WITH CAM LEVER AND RECIPROCATING SLEEVE

BACKGROUND OF THE INVENTION

1. Field of the Invention

The present invention relates to a socket for use in combination with a plug to form a pipe coupling with lock balls and, more particularly, it is related to the structure of a socket which is used for the pipe coupling to connect a small-sized gas cylinder to the piping.

2. Description of the Related Art

Conventionally, the carbon dioxide gas cylinder housed in the automatic vending machine for carbonated drinks was connected to the piping in the automatic vending machine, using a union nut for the base of the gas cylinder.

The space in the automatic vending machine is quite small. Therefore, this connecting manner is excellent in that it needs no large space. When the used gas cylinder was to be exchanged with a new one, however, tools such as the wrench never failed to be needed to thereby make the exchanging operation troublesome.

SUMMARY OF THE INVENTION invention is intended to eliminate the above-mentioned drawbacks and the object of the present invention is therefore to provide a coupling socket which enables the exchange of the used gas cylinder with a new one to be attained by one touch operation and which makes it easier to exchange the used gas cylinder with a new one even in a small space such as in the automatic vending machine.

This and other objects as well as merits of the present invention can be achieved by a socket for use in combination with a plug of the type having a cylindrical connecting portion, the socket comprising a main cylinder detachably attached onto the connecting portion of the plug and provided with a cylindrical side wall for defining an inner hole which extends therein in the axial direction thereof, slits formed at the side wall of the main cylinder, extending in the axial direction thereof, and a lock system for selectively locking the connecting portion of the plug: a sleeve including a rear portion guided through the inner hole of the main cylinder in the axial direction thereof, a front portion of a small-diameter which can be inserted into the connecting portion of the plug, an inner passage opened at the small-diameter front portion, and at least one engaging member having a front end projected outward from the rear portion in the radial direction and then outside through the slits, wherein the sleeve can move between advanced position where the inner flow passage is communicated with a flow passage in the connecting portion of the plug end retreated position where they are separated from each other; an operating lever pivoted on the side wall of the main cylinder to selectively move between first and second positions, the lever being locked at one of the first and second positions when the socket is connected to the connecting portion of the plug; and a guide means arranged on the operating lever to guide the engaging members in such a way that the sleeve is positioned at its advanced position when the operating lever is at the first position and that the sleeve is positioned at its retreated position when the operating lever is at the second position.

When the lock system is released, the socket of the present invention is made ready for being connected to the plug. The main cylinder of the socket is then slid on the outer circumferences of the connectors of the plug and fitted onto them, the socket is connected to the plug.

When the operating lever is then operated, the engaging members which serve as an active point is moved along the slit in the main cylinder of the socket by the guide means of the operating lever. The smaller-diameter portion of the front inner sleeve is thus slid through the opening of the top of the plug.

When the front inner sleeve advances to the utmost extent, the smaller-diameter portion of the front inner sleeve is fitted into the opening the top of the plug and the communicating holes in the front inner sleeve are opposed to the gas outlet of the plug. When the valve in the plug is then opened, gas flows into the flow passages in the inner sleeves, passing through the flow passage in the plug.

As the engaging members separate remoter from the axial hole, the crossing angle of the curved slits along which the engaging members move becomes larger relative to the axial center line of the socket. Even when the speed at which the operating lever is operated is same at all times, therefore, the advancing speed of the inner sleeves is relatively high at first but it becomes gradually lower as the inner sleeves come nearer to their most advanced positions. Even when high pressure is added to the inner sleeves upon the opening of the valve after the connection of the socket relative to the plug is finished, therefore, the lever can be smoothly operated.

The socket of the present invention is connected to the plug through the lock system and after his connection between the socket and the plug is finished, the lever is operated independently of its operation carried out at the time when the socket is to be connected to the plug to thereby open and close the gas flow passages. This enables connection and disconnection of the socket, in which high pressure fluid flows, to be safely and smoothly attached. In addition, the exchange of the used gas cylinder with a new one can be made easier without making anybody feel troublesome.

Further, the operating lever can be made more compact in size. Therefore, the socket makes it easier to connect a new gas cylinder to the piping at the small space in the automatic vending machine for drinks.

Additional objects and advantages of the invention will be set forth in the description which follows, and in part will be obvious from the description, or may be learned by practice of the invention. The objects are advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, sever to explain the principles of the invention.

The drawings show an example of the socket according to the present invention, in which.

DETAILED DESCRIPTION OF THE PREFERRED EMBODIMENT

Figure 1:
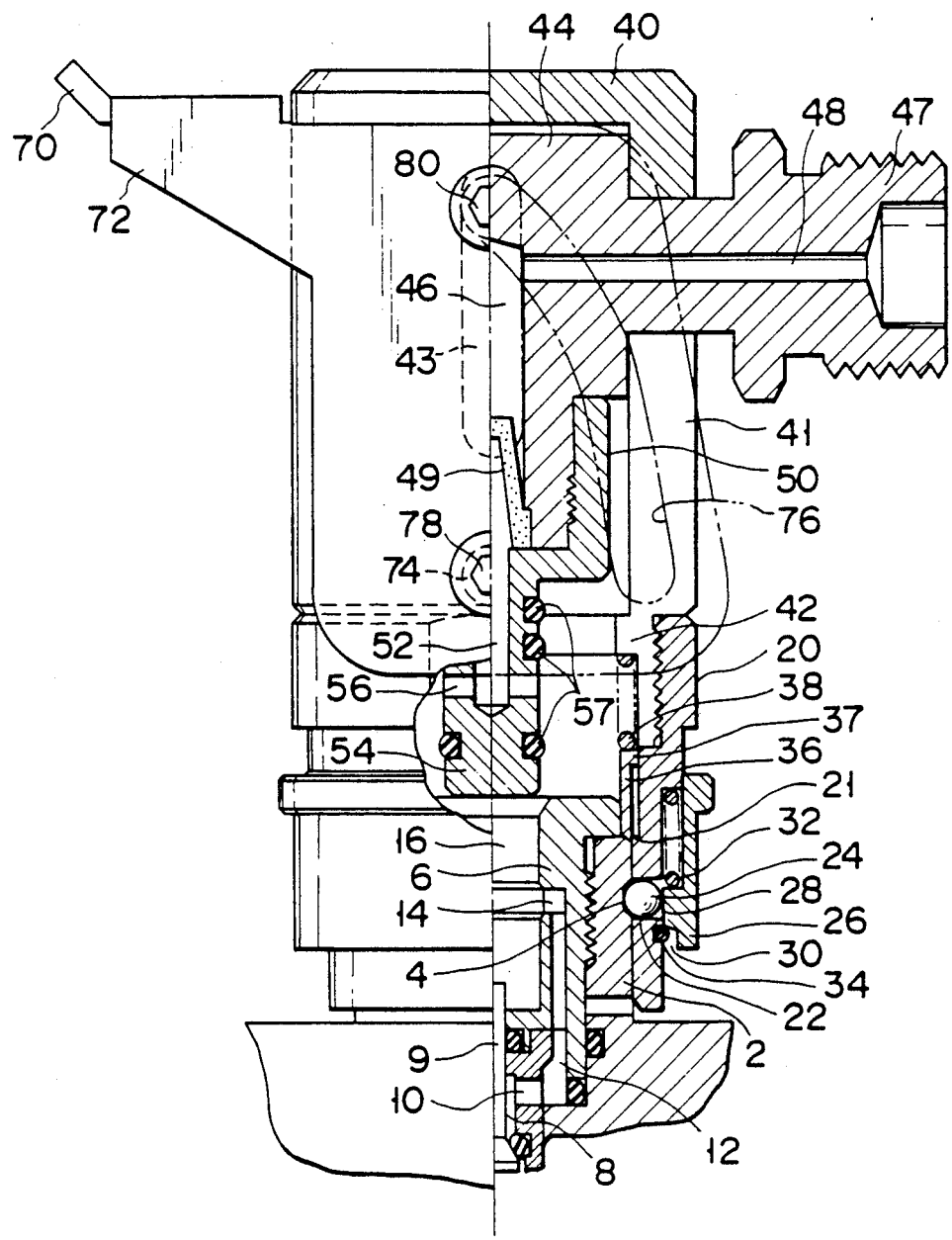
FIG. 1 is a side view, a part of which is vertically sectioned, showing the socket connected to a plug.

FIG. 1 is a side view, a part of which is vertically sectioned, showing a socket of the present invention directed to be practically used and connected to a plug through lock balls. The plug connected to the side of fluid of higher pressure is therefore shown, also as a side view a part of which is vertically sectioned, at the lower portion of FIG. 1.

As well-known, a circumferential groove 4 is formed on the outer circumference of the plug. An inner sleeve 6 of the plug provided with a gas flow passage 8 extending in the axial direction of the plug is screwed into the inner circumferential face of an outer sleeve 2 of the plug on the outer circumference of which the circumferential groove 4 is formed. The gas flow passage 8 is communicated with an end of an eccentric gas flow passage 12, which extends parallel to the axial center of the plug, through a communicating hole 10 The other end of the eccentric gas flow passage 12 is opened to form a gas outlet 14 in an opening 16 of the inner sleeve 6 of the plug. Reference numeral 9 represents the head of a valve arranged in the gas flow passage 8.

A main cylinder of the socket according to the present invention comprises two front and rear cylinder sections 20 and 40 screwed to each other.

Several tapered holes 22 each being wider outside than inside and penetrating the front cylinder section from the outer to the inner circumference thereof are provided at the front portion of the front cylinder section 20, and a lock ball 24 is held in each of the tapered holes 22. Each of the lock balls 24 is contacted at its outer side with an operating sleeve 26 which has a ball pressing portion 28 on its inner circumferential face and a ball releasing portion 30 thereon for releasing the balls 24 from the ball pressing portion 28. The operating sleeve 26 is urged forward by a compression coil spring 32 and fitted freely slidably onto the front outer circumference of the front cylinder section 20. Reference numeral 34 denotes a stopper ring arranged at the front end of the front cylinder section 20 to prevent the operating sleeve 26 from coming out of the front cylinder section 20.

Reference numeral 36 denotes a slide ring freely slidable on the inner circumference of the front cylinder section 20 and the slide ring 36 is provided with a collar 27 at the rear end thereof. A compression coil spring 38 is arranged between the rear end face of the slide ring 36 and a stepped portion 42 formed on the front inner circumference of the rear cylinder section 40 and the slide ring 36 is usually urged forward by this compression coil spring 38. Reference numeral 21 represents a stepped portion formed on the inner circumference of the front cylinder section 20 to prevent the slide ring 36 from coming out from inside the front cylinder section 20.

A slide sleeve 44 having a flow passage 46 therein is housed in the rear cylinder section 40 and slid in the rear cylinder section 40 by an operating lever 70 which will be described later. Reference numeral 49 represents a filter arranged in the flow passage 46. A nozzle 47 having therein a flow passage 48 communicated with the flow passage 46 in the slide sleeve 44 is attached to the rear side of the slide sleeve 44. A slit 41 is provided at the side of the rear cylinder section 40 to allow the nozzle 47 to move forward and backward together with the sliding slide sleeve 44.

An inner sleeve 50 having therein a flow passage 52 communicated with the flow passage 46 in the slide sleeve 44 is screwed onto the front of the slide sleeve 44. The front portion of the inner sleeve 50 is made to have so smaller a diameter as to be fitted into the opening 16 of the inner sleeve 6 of the plug. Plural through-holes 56 are formed, penetrating the smaller-diameter portion 54 of the inner sleeve 50, at those positions of the sleeve 50 which are opposed to the gas outlet 14 of the inner sleeve 6 of the plug when the smaller-diameter portion 54 of the inner sleeve 50 is fitted into the inner sleeve 6 of the plug. Further, O-rings 57a, 57b and 57c are seated in circumferential grooves on the outer circumference of the smaller-diameter portion 54 of the inner sleeve 50 with the through-holes 56 interposed between the one O-ring and the other two O-rings.

The operating lever 70 is shaped like a inverted U, bestriding the rear cylinder section 40, and each of its both leg plates 72 is made substantially rectangular. The leg plates 72 are provided with axial holes 74 at the relatively lower portion thereof in FIG. 1 and at those positions thereof which are symmetrical to the axis of the rear cylinder section 40. They are also provided with curved slots 76 around the axial holes 74, starting from a position above the axial holes 74 and terminating at the lower corner of the leg plates 72. First bolts 78 are pivoted on sides of the rear cylinder section, each passing through the axial hole 74, and used as a fulcrum of the operating lever 70. Second bolts 80 are also pivoted on sides of the slide sleeve 44, each passing through the curved slot 76 and one of another slots 43 which are formed in sides of the rear cylinder section 40, extending vertically along the axial line of the slide sleeve 44.

Figure 2:
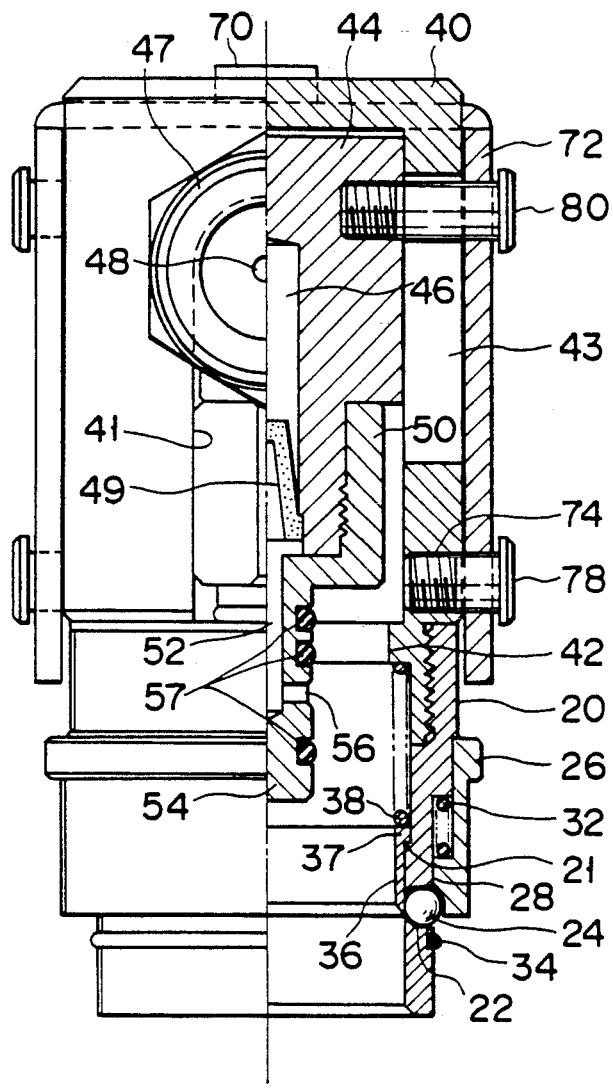
FIG. 2 is a side view, a part of which is vertically sectioned, showing the socket made ready for being connected to the plug, said socket being viewed from its right side in FIG. 1.

FIG. 2 is a side view, a part of which is vertically sectioned, showing the socket viewed from its right side in FIG. 1 and made ready for its being connected to the plug.

When the operating sleeve 26 is lifted against the compression coil spring 32, the lock balls 24 are released from that pressure of the ball pressing portion 28 which presses the lock balls 24 in a direction reverse to their centripetal direction, and engaged with the ball releasing portion 30 of the operating sleeve 46. The lock balls 24 do not project strongly from their tapered holes 22 at this time. The slide ring 36 thus usually urged forward by the compression coil spring 38 passes over the lock balls 24 at its front end and the collar 37 of the slide ring 36 is struck against the stepped portion 21 of the front cylinder section 20, thereby causing the slide ring 36 to be stopped.

When the front cylinder section 20 of the socket is pushed while being slid on the outer circumference of the outer sleeve 2 of the plug in FIG. 1, the front end of the slide ring 36 is struck against the rear end of the outer sleeve 2 of the plug and the slide ring 36 is thus pushed to slide rearward in the front cylinder section 20. When the circumferential groove 4 is aligned with the tapered holes 22 while sliding the inner circumference face of the front cylinder section 20 of the socket on the outer circumferential face of the outer sleeve 2 of the plug, the lock balls 24 are engaged with the circumferential groove 4 and the sleeve 26 is forced by the compression coil spring 32 to slide on the outer circumference of the front cylinder section 20 until it is struck against the stopper ring 34 at its front end and stopped by this stopper ring 34. The ball pressing portion 28 limits the movement of the lock balls 24 in their centrifugal direction at this time. Therefore, the lock balls 24 are kept seated in the circumferential groove 4 on the outer sleeve 2 of the plug to thereby finish the connection of the socket relative to the plug.

When the operating lever 70 is rotated round the first bolts 78 while moving the second bolts 80 along the curved slits 76 formed at the leg plates of the lever 70 and also along the slits 43 formed at the rear cylinder section 40, the slide sleeve 44 on which the second bolts 80 are pivoted advances forward in the rear cylinder section 40 and the smaller-diameter portion 54 of the inner sleeve 50 which is fixed to the front portion of the slide sleeve 44 also slides through the front opening 16 of the inner sleeve 6 of the plug.

When the inner sleeve 50 advances to its utmost extent, the smaller-diameter portion 54 of the inner sleeve 50 is completely fitted into the front end portion of the inner sleeve 6 of the plug. The communicating holes 56 of the inner sleeve 50 are thus opposed to the gas outlet 14 of the inner sleeve 6 of the plug and the gas flow passage 8 in the inner sleeve 6 of the plug is communicated with the flow passage 52 in the inner sleeve 50 and the flow passage 46 in the slide sleeve 44 with the flow passage 48 in the nozzle 47 in this order. After the communicating holes 56 are communicated with the gas outlet 14, the communicating passage thus formed is sealed by the O-rings 57a, 57b and 57c.

Figure 3:
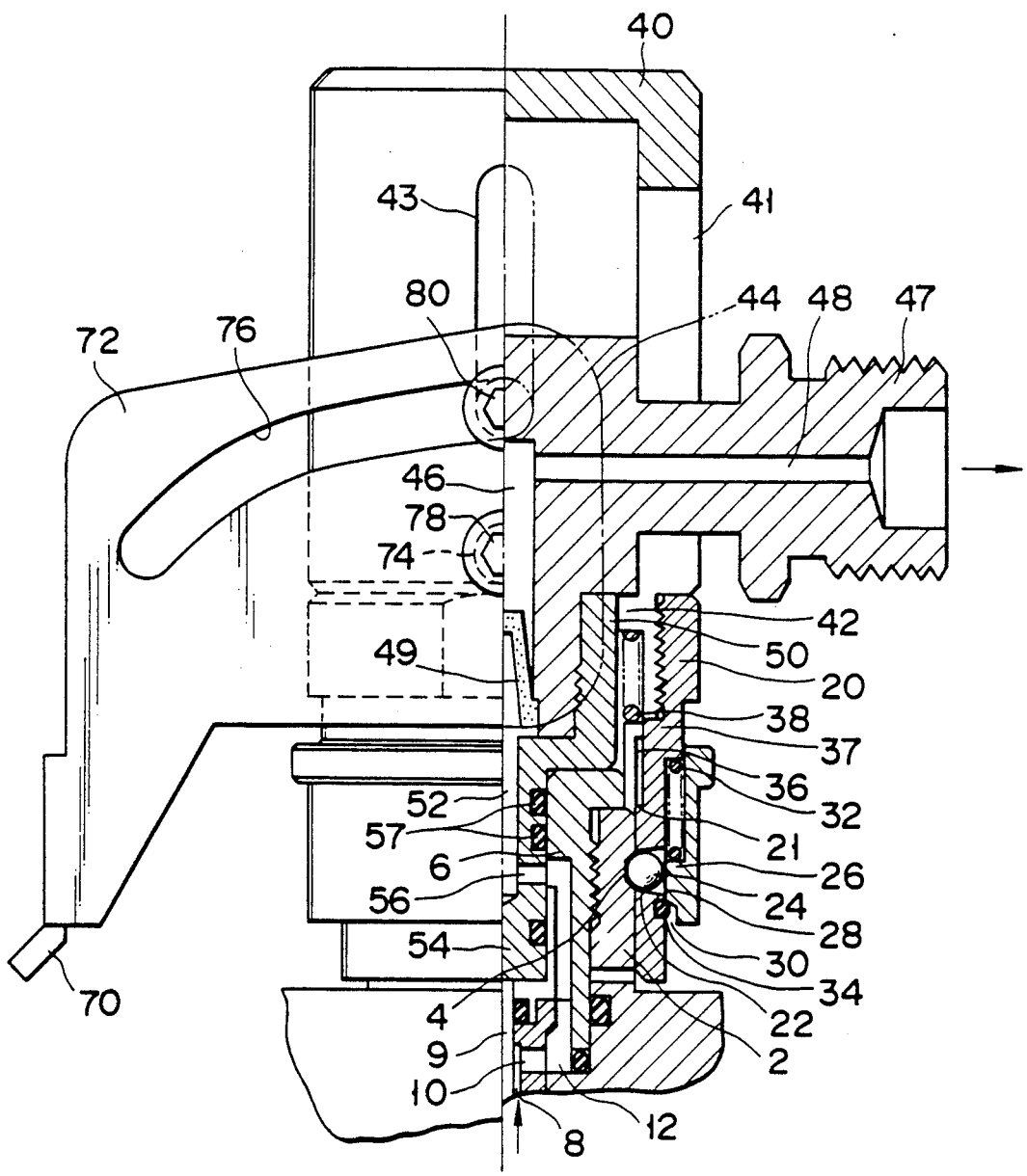
FIG. 3 is a side view, a part of which is vertically sectioned, showing all of passages in the socket communicated with one another.

FIG. 3 is a side view, a part of which is vertically sectioned, showing the socket under this state.

According to this example of the socket, the front end of the smaller-diameter portion 54 of the inner sleeve 50 pushes the head 9 of the valve when the smaller-diameter portion 54 is slid and fitted into the inner sleeve 6 of the plug. The valve is thus opened to allow fluid to flow at the first time.

When the valve is opened, the gas flow passage 8 is communicated with the eccentric gas flow passage 12 through the communicating hole 10 to thereby form an eccentric gas flow passage suitable for high pressure fluid.

As the second bolts 80 separate remoter from the axial hole 74 in the course of operating the lever 70, they move along the slits 76 which are formed at the leg plates 72 and curved to have a larger and larger crossing angle relative to the axial center line of the main cylinder of the socket, in other words, to have a smaller and smaller varying rate of curvature as the second bolts 80 come nearer to the first bolts 78 or to have a central portion with large curvature. Even when the speed of operating the lever 70 is not changed, therefore, the inner sleeve 50 advances relatively fast at first but gradually slower and slower as it comes nearer to its utmost advanced position. Even if high pressure is added to the slide sleeve 44 upon the opening of the valve after the connection of the socket relative to the plug is finished, the operating of the lever 70 can be attained smoothly.

As shown in FIG. 3, the distance between the bottom of the rectangular leg plates 72 and the rear end face of the operating sleeve 26 is set shorter than that sliding distance of the sleeve 26 which is needed to detach the socket from the plug. When the valve is opened and the gas flow passage 8 is kept open (or when the lever 70 is kept pushed down), therefore, the operating sleeve 26 can be stopped from sliding rearward to thereby prevent the lock balls 24 from unexpectedly coming out of the circumferential groove 4.

When the operating lever 70 which is under such a state as shown in FIG. 3 is operated in the reverse direction, the smaller-diameter portion 54 of the inner sleeve 50 slides rearward through the opening 16. The valve in the plug is released from that pressure which is applied from the front end of the smaller-diameter portion 54 to the valve, and the gas flow passage 8 is closed at the initial stage of the rearward sliding of the smaller-diameter portion 54 through the opening 16.

When the operating sleeve 26 is then retreated against the compression coil spring 32, the lock balls 24 are released from the ball pressing portion 28 and engaged with the ball releasing portion 30. The lock balls 24 are released from the circumferential groove 4 on the outer sleeve 20 of the plug under this state and the top of the outer sleeve 2 of the plug pushes the front end of the slide ring 36 which is urged by the compression coil spring 38. The socket can be thus smoothly detached from the plug.

Additional advantages and modifications will readily occur to those skilled in the art. Therefore, the invention in its broader aspects is not limited to the specific details, and representative devices, shown and described herein. Accordingly, various modifications may be without departing from the spirit or scope of the general inventive concept as defined by the appended claims and their equivalents.

What is claimed is:

1. A socket for use in combination with a plug of the type having a cylindrical connecting portion, the socket comprising:

a main cylinder provided with a cylindrical side wall for defining an inner hole which extends therein in the axial direction thereof, slits formed at the side wall of the main cylinder, extending in the axial direction thereof, and a lock system for selectively locking the connecting portion of the plug, said main cylinder being detachably attached onto the connection portion of the plug;

a sleeve including a rear portion guided through the inner hole of the main cylinder in the axial direction thereof, a front portion of a small-diameter which can be inserted into the connecting portion of the plug, said sleeve having an inner passage opening at the small-diameter front portion, and at least one engaging member having front end portions projected outward from the rear portion in the radial direction and then outside through the slits, wherein said sleeve can move between advanced position where the inner flow passage is communicated with a flow passage in the connecting portion of the plug and retreated position where they are separated from each other;

an operating lever pivoted on the side wall of the main cylinder to selectively move between first and second positions, said lever being locked at one of the first and second positions when said socket is connected to the connecting portion of the plug; and a guide means arranged on said operating lever to guide the engaging member in such a way that the sleeve is positioned at its advanced position when the operating lever is at the first position and that the sleeve is positioned at its retreated position when the operating lever is at the second position.

2. The socket according to claim 1, wherein said operating lever has a substantially U-shaped opening at one end thereof and each leg portion is formed as a rectangular plate.

3. The socket according to claim 2, wherein said guide means has a pair of curved slits formed at the leg plates of the operating lever, extending from one end to the other end of the operating lever, and the front end portions of the engaging member are guided along the curved slits.

4. The socket according to claim 3, wherein each of the curved slits has a curved central portion, and said inner sleeve is are guided at low speed when the operating lever is moved near the first position, and is guided at high speed when it is moved near the second position.

5. The socket according to claim 4, wherein said sleeve has the flow passage therein in communication with the inner flow passage of a nozzle member extending outward therefrom in the radial direction, and said main cylinder is provided with a second slit for allowing the nozzle member to be moved together with the inner sleeve in the axial direction thereof.

6. The socket according to claim 5, wherein said inner flow passage have at least one hole formed in the front portion of the sleeve and directed in the radial direction of the sleeve, and said front portion of the sleeve has at least one seal for preventing fluid from leaking between the smaller-diameter portion and the connection portion of the plug when inserted therein.

7. The socket according to claim 6, wherein said main cylinder includes a rear cylinder section for guiding the rear inner sleeve and a front cylinder section fixed to the rear cylinder section and serving to receive thereinto the connecting portion of the plug, and said front cylinder section includes at least one hole directed in the radial direction of this cylinder section and tapered to have a diameter larger at the top side than at the bottom side thereof, a locking ball held in the tapered hole, and an operating sleeve slidably fitted onto the rear cylinder section to selectively urge the lock ball in the radial direction thereof.

8. The socket according to claim 7, wherein said main cylinder includes a slide sleeve which prevents the lock ball from moving inward in the radial direction of the cylinder when the socket is detached from the connectors of the plug but allows it to move inward in the radial direction thereof when the socket is connected to the connectors of the plug.

* * * * *